Jan. 17, 1933.  J. F. H. FECHTENBURG  1,894,905
SUCTION COMB
Filed June 19, 1929   2 Sheets-Sheet 1
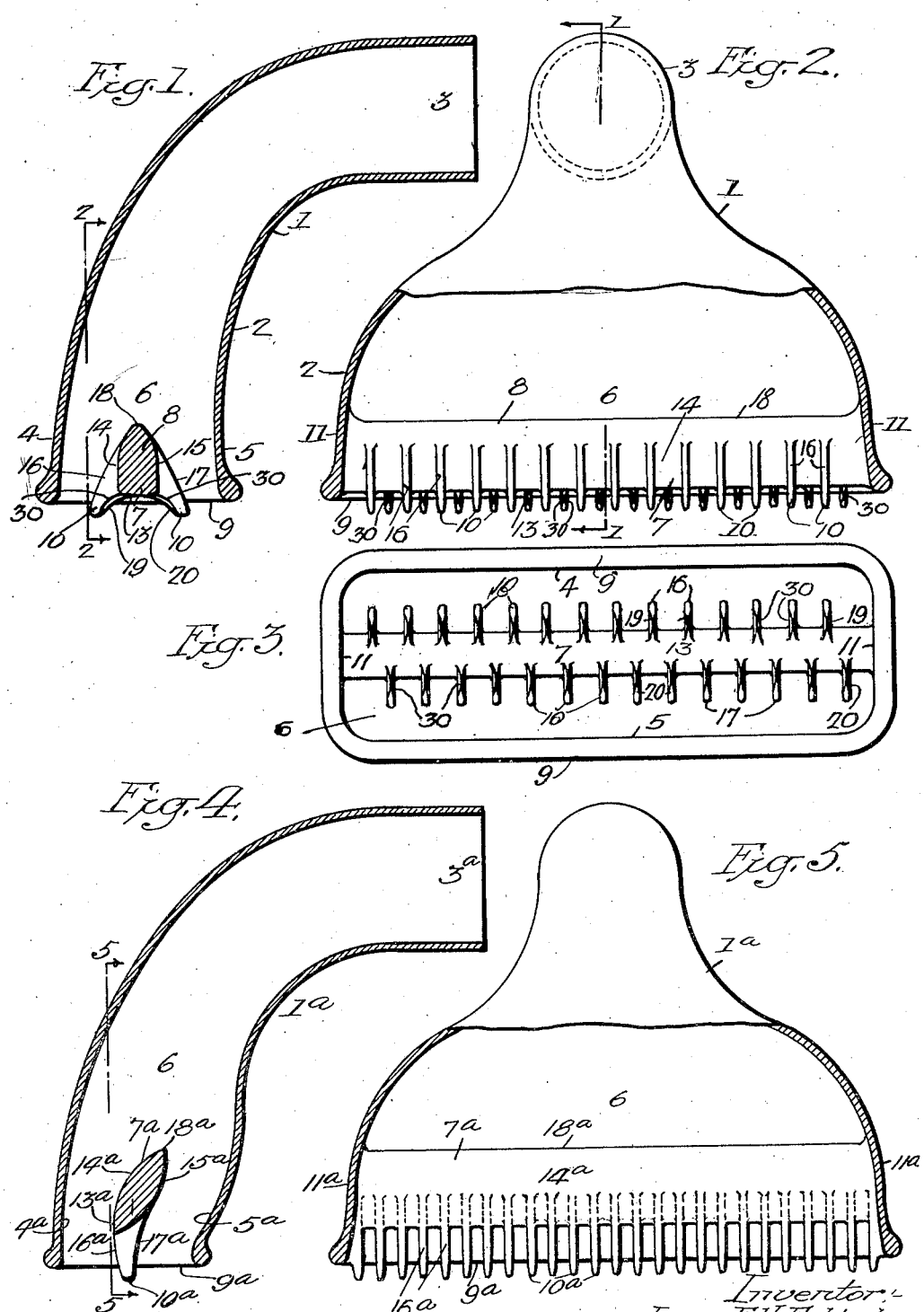

Jan. 17, 1933. J. F. H. FECHTENBURG 1,894,905
SUCTION COMB
Filed June 19, 1929  2 Sheets-Sheet 2
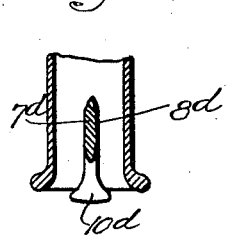
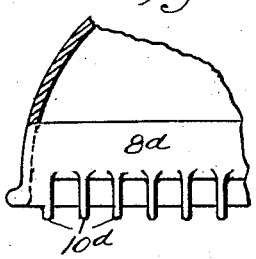
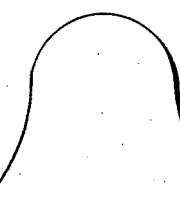
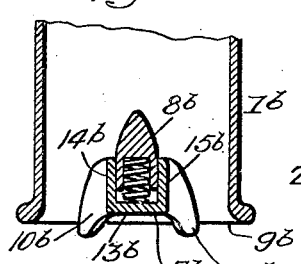
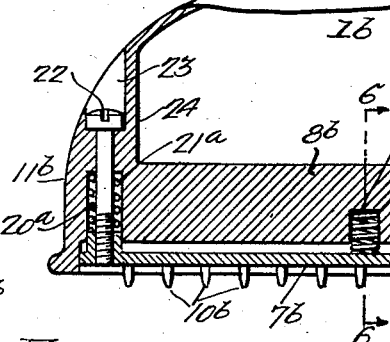
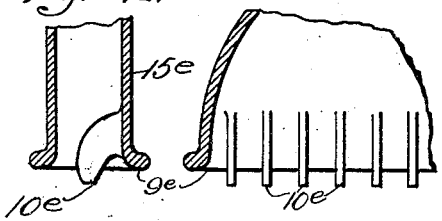
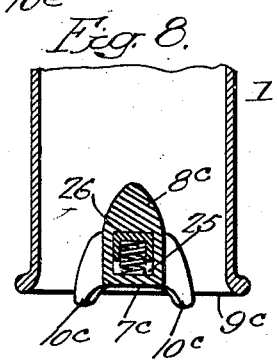
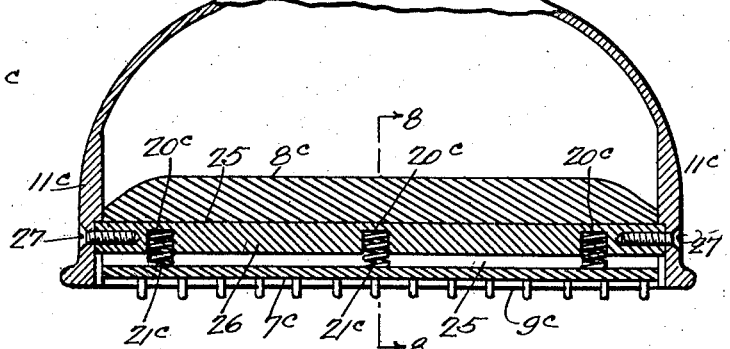
Inventor:
Jorgen F. H. Fechtenburg
by his Attorneys,
Howson & Howson Patented Jan. 17, 1933

1,894,905

UNITED STATES PATENT OFFICE

JÖRGEN F. H. FECHTENBURG, OF CHELTENHAM TOWNSHIP, MONTGOMERY COUNTY, PENNSYLVANIA

SUCTION COMB

Application filed June 19, 1929. Serial No. 372,122.

This invention relates to a suction comb adapted for use in the cleaning of cows, horses and other animals, and constitutes an improvement to a similar device shown and described in my co-pending application Serial No. 320,607, filed November 20, 1928.

The device comprises a comb which is adapted to sleek the animal's coat and at the same time loosen any dirt or scurf which may be imbedded in the hair, the suction nozzle, which is combined with the comb, acting to carry the foreign matter away immediately and thereby prevent its resettling on the animal.

It will be understood that the suction nozzle is adapted to be coupled to any suitable form of vacuum producing apparatus for creating the desired suction in the nozzle around the comb.

The object of the present invention is to construct the comb in such a manner that it will be equally effective as it is moved in either a forward or a backward stroke over an animal's hide, and at the same time prevent the loose hair from becoming entangled in the comb, obviating the clogging of the nozzle.

Referring to the drawings:

Fig. 1 is a longitudinal sectional elevation of the device taken on the line 1—1, Fig. 2;

Fig. 2 is a transverse sectional elevation taken on the line 2—2, Fig. 1;

Fig. 3 is an inverted plan view;

Figs. 4 and 5 are views similar to Figs. 1 and 2 respectively, showing one modified form of the invention, Fig. 5 being a section on the line 5—5, Fig. 4, and Figs. 6 and 7, 8 and 9, 10 and 11, and 12 and 13, illustrate other modified forms within the scope of the invention.

The device, as shown in Figs. 1, 2 and 3, comprises a suction nozzle 1, which consists of an elongated hollow body portion 2, which is shaped in a manner to comfortably fit the hollow of the hand of an operator, by gracefully curving upwardly from the mouth of the nozzle and inwardly from the opposite ends thereof, toward its center, where the said hollow body portion is provided with a substantially cylindrical hollow extension 3, which projects from one side of the said body portion and conforms to the lateral curvature of the body portion of the nozzle.

The respective side walls 4 and 5 of the hollow body portion 1 are spaced apart to form the elongated mouth or opening 6 of the nozzle, in which is located the comb 7.

The comb 7 comprises a solid portion or back bar 8 which is located within the opening 6 of the body portion 2 and is spaced above and substantially parallel to the bottom edge 9 of the said body portion 2.

The teeth 10 of the comb 7 project from the back bar 8 of the comb to a point below or outside the bottom edge 9 of the body portion 2 of the suction nozzle 1.

As shown in Figs. 1, 2 and 3, the back bar 8 is formed integral with and extends between the end walls 11, 11 of the body 2, and is disposed in and extends through the mouth 6 of the nozzle substantially at the center thereof.

The teeth 10 are divided into two separate series, the teeth of the series being respectively disposed in staggered relation with respect to each other along the opposite sides 14 and 15 of the back bar 8, and the oppositely disposed outside edges 16 and 17 of the teeth 10, 10 flare downwardly in opposite directions toward the adjacent side walls 4 and 5 of the nozzle.

The lower face 13 of the back bar 8 is substantially flat and forms the base of the spaces between the teeth 10, 10. The inner edges 19 and 20 of the teeth 10, 10 are in divergent relation to the outer edges 16 and 17 respectively of said teeth, and extend from the ends of the teeth to the base surface 13 of the back bar 8.

This face 13 is of such a width that the hairs, loosened by the teeth 10 and drawn into the nozzle between either of the adjacent pairs of the side walls 4 and 14, or 5 and 15, cannot straddle the back bar 8 and thereby remain on the surface 13 thereof, to clog the nozzle, but a greater portion of the length of any single hair will extend into the space between either one or the other of the said pairs of adjacent walls and, therefore, will be drawn into the nozzle.

The back edge 18 of the back bar 8 is relatively sharp and is formed by the side walls 14 and 15 thereof converging, which produces stream lines for the passage of the air and obviates the possibilities of any eddies or air pockets being formed within the nozzle, which would tend to retard the carrying away of the loose hairs and scurf.

The device shown in Figs. 1 and 2 is particularly adapted for use with animals which are shedding their hair and for animals having relatively long hair, the spacing of the teeth being comparatively wide so as not to present excessive retardation to a large amount of loose hair passing into the nozzle and at the same time being sufficiently close together to separate the hair so that the loose hairs and scurf can be readily removed from the animal's coat.

The device shown in Figs. 4 and 5 is adapted for use with animals which have comparatively short hair, or those which are not shedding, such conditions permitting the teeth to be placed closer together and in a single row, however, like the device shown in Figs. 1, 2 and 3, the oppositely disposed edges 16a and 17a of the teeth 10a are divergent.

This divergency of the opposite edges of the teeth of the comb permits the comb to be moved over the hide in either a forward or a backward stroke with equal effectiveness, the angularity of the edges of the teeth permitting the teeth to move easily over the hide without rolling the hide into wrinkles, which would irritate the animal and cause it to become restless and hard to clean, and at the same time the teeth will penetrate the mass of hair, separating the hair and loosening any scurf or dirt adhering to the skin, so that such foreign matter and loose hair can be readily carried off by the suction created in the nozzle.

As shown in Figs. 4 and 5, the back bar 8a is substantially elliptical in cross-section, the sides 14a and 15a being curved toward each other and the oppositely disposed edges 13a and 18a formed thereby being relatively sharp to present the stream line effect above noted.

As shown in Fig. 4, the edges 13a and 18a are disposed in a plane extending at an angle across the mouth of the nozzle above the bottom face 9a of the nozzle, and this angularity and the sharp edge 13a of the bar 8a combine to discourage the straddling of the bar 8 by the loose hairs due to the point 13a being closer to the wall 4a of the nozzle than to the wall 5a thereof, causing currents of air passing into the nozzle to circulate around the edge 13a and thereby carry off any hair which would tend to adhere thereto.

The back bar 8a, like the back bar 8, is formed integral with and extends between the end walls 11a, 11a of the nozzle 1a.

In the devices shown in Figs. 6 and 7, and 8 and 9, respectively, the combs 7b and 7c are formed in substantially the same manner as the comb 7 shown in Figs. 1, 2 and 3, with the exception that these latter combs are movable relative to the nozzle in a plane substantially perpendicular to the faces 9b and 9c of the nozzles 1b and 1c respectively.

In Figs. 6 and 7, the back bar 8b is formed integral with and extends between the end walls 11b, 11b of the nozzle 1b and the walls 13b, 14b and 15b combine to form an elongated channel member on which the teeth 10b are formed, the walls 14b and 15b extending upwardly along and being slidable with respect to the sides of the back bar 8b.

The back bar 8b is provided with cavities 20, 20a, in which are springs 21, 21a, which tend to force the comb 7b out of the nozzle 1b, this movement being limited by screws 22, 22 slidably mounted in the cavities 20a, 20a, and in apertures 23, 23, formed in enlargements 24, 24 formed in the opposite ends of the nozzle 1b.

By adjusting the screws 22, 22, the distance which the ends of the teeth 10b, 10b extends beyond the surface 9b of the nozzle may be minutely controlled to suit the requirements or ideas of the operator.

In Figs. 8 and 9, the comb 7c is likewise movable with respect to the nozzle 1c in a plane substantially perpendicular to the face 9c, and for this purpose the back bar 8c of the nozzle is hollow as indicated at 25 for the accommodation of a supplemental bar 26 which extends between and is secured to the end walls 11c, 11c of the nozzle 1c by screws 27, 27, springs 21c, 21c located in cavities 20c, 20c formed in the supplemental bar 26 tending to force the comb 7c outwardly from the nozzle 1c.

In Figs. 10 and 11, the back bar 8d is of lesser width than the widest portion of the teeth 10d and the edges of the teeth 10d flare outwardly for the purposes noted and the back bar 8d is rigidly secured to the end walls in any suitable manner, such for example as slotting the said end walls and forcing the ends of the comb 7d into the slots.

In Figs. 12 and 13, the teeth 10e are formed integral with one of the side walls of the nozzle, for example the side wall 15e.

From the above, it will be noted that in each case the opposite edges of the teeth are disposed at angles extending in opposite directions with respect to each other and with respect to a plane disposed perpendicular to the plane of the mouth of the nozzle so that regardless of whether the comb is being moved through a forward or a backward stroke, the teeth will present an angular surface to the hide which will obviate the wrinkling thereof under the comb.

The corners of the teeth as shown in the several views of the drawings are slightly rounded so that there will be no tendency for the teeth to scratch below the surface of the hide.

From the drawings, it will be observed that the side walls, for example the walls 14 and 15 of the device shown in Fig. 1, are spaced a sufficient distance from the comb 7, and the teeth 10 of the comb project such a relatively slight distance below the face 9 of the nozzle, that it will be impossible for the comb to be tilted to such an extent that the edges of the teeth would be presented to the hide of an animal in a position perpendicular to the hide of the animal being cleaned, thereby obviating such a condition, which would result in the skin being wrinkled under the teeth of the comb. To this end the angle of flare of the edges of the teeth is great enough with respect to the plane of the surface 9 that even in the maximum tilt permitted wherein the bottom edge of one or the other of the walls 14 or 15 of which the surface 9 is formed is in contact with the hide and the ends of the teeth 10 are also in contact with the hide, the said edges of the teeth will be presented at an angle other than 90° to the hide.

The tendency of the edges 19 and 20 relative to the face 13 of the back bar 8 permits the comb to free itself of any loose hairs which may have assumed positions parallel to the back bar and lying across a number of the teeth, in which case the hairs of the animal's coat which are not loose will act as a brush to brush the said loose hairs out over the ends of the teeth 10, whereupon such loose hairs will be drawn into the nozzle between the outer edge of the teeth and the adjacent side wall of the nozzle.

In the form of the device shown in Figs. 1, 2 and 3, the inner edges 19 and 20 of the teeth 10 are beveled as indicated at 30 so that these edges, the pitch of which is relatively slight with respect to the plane of the mouth of the nozzle, will not ride up on the hair and lift the working edge 16 or 17, as the case may be, from out of the hair on the backward and forward strokes of the device over the animal's coat. The beveling of the sides of the teeth in the manner indicated at 30 causes the edges 19 and 20 to assume a relatively sharp edge which will plow through the hair rather than ride over the same.

I claim:

1. A suction comb device comprising a suction nozzle having a mouth opening disposed in a predetermined plane, a comb comprising a relatively broad flat faced back bar disposed in the mouth opening, said broad face of the back bar being spaced inwardly from the plane of the mouth opening of the nozzle, and teeth on said back bar projecting from opposite sides of said back bar and extending beyond the plane of the mouth opening, said teeth being of relatively thin elongated cross-section and arranged with the longer dimension thereof disposed in the direction of normal operation of the device.

2. A suction comb device comprising a suction nozzle having a mouth opening disposed in a predetermined plane, a comb comprising a relatively broad flat faced back bar disposed in the mouth opening, said broad face of the back bar being spaced inwardly from the plane of the mouth opening of the nozzle, and teeth on said back bar projecting from opposite sides of said back bar and extending beyond the plane of the mouth opening, said teeth being of relatively thin elongated cross-section and arranged with the longer dimension thereof disposed in the direction of normal operation of the device, the teeth on the opposite sides of said back bar being disposed in staggered alternating relation with respect to each other.

3. A suction comb device comprising a suction nozzle having a mouth opening disposed in a predetermined plane, a comb comprising a relatively broad flat faced back bar disposed in the mouth opening, said broad face of the back bar being spaced inwardly from the plane of the mouth opening of the nozzle, and teeth on said back bar projecting from opposite sides of said back bar and extending beyond the plane of the mouth opening, said teeth being of relatively thin elongated cross-section and arranged with the longer dimension thereof disposed in the direction of normal operation of the device, one edge of each tooth being concaved from the said projecting end thereof to the said flat face of the back bar.

4. A suction comb device comprising a suction nozzle having a mouth opening disposed in a predetermined plane, a comb comprising a relatively broad flat faced back bar disposed in the mouth opening, said broad face of the back bar being spaced inwardly from the plane of the mouth opening of the nozzle, and teeth on said back bar projecting from opposite sides of said back bar and extending beyond the plane of the mouth opening, said teeth being of relatively thin elongated cross-section and arranged with the longer dimension thereof disposed in the direction of normal operation of the device, one edge of each tooth being concaved from the said projecting end thereof to the said flat face of the back bar, said concave edge being beveled to present a relatively sharp edge in the direction of normal operation of the device.

5. In a suction comb device including a nozzle having an elongated mouth opening disposed in a predetermined plane and extending at right angles to the direction of normal operation of the device, a comb comprising a relatively thick back bar rigidly and centrally disposed in and extending the length of the mouth opening, and teeth of oblong cross section projecting from the back bar outwardly through and beyond the plane of the mouth opening with the greater cross sectional dimension of each tooth substantially parallel to the said direction of normal operation of the device.

6. In a suction comb device including a nozzle having an elongated mouth opening disposed in a predetermined plane and extending at right angles to the direction of normal operation of the device, a comb comprising a relatively thick back bar rigidly and centrally disposed in and extending the length of the mouth opening, and teeth of oblong cross section projecting from the back bar outwardly through and beyond the plane of the mouth opening with the greater cross sectional dimension of each tooth substantially parallel to the said direction of normal operation of the device and the opposite edges of each tooth which define the said greater dimension thereof converging from the back bar toward that end of the tooth disposed beyond the mouth opening.

JÖRGEN F. H. FECHTENBURG.